Figure 1A:
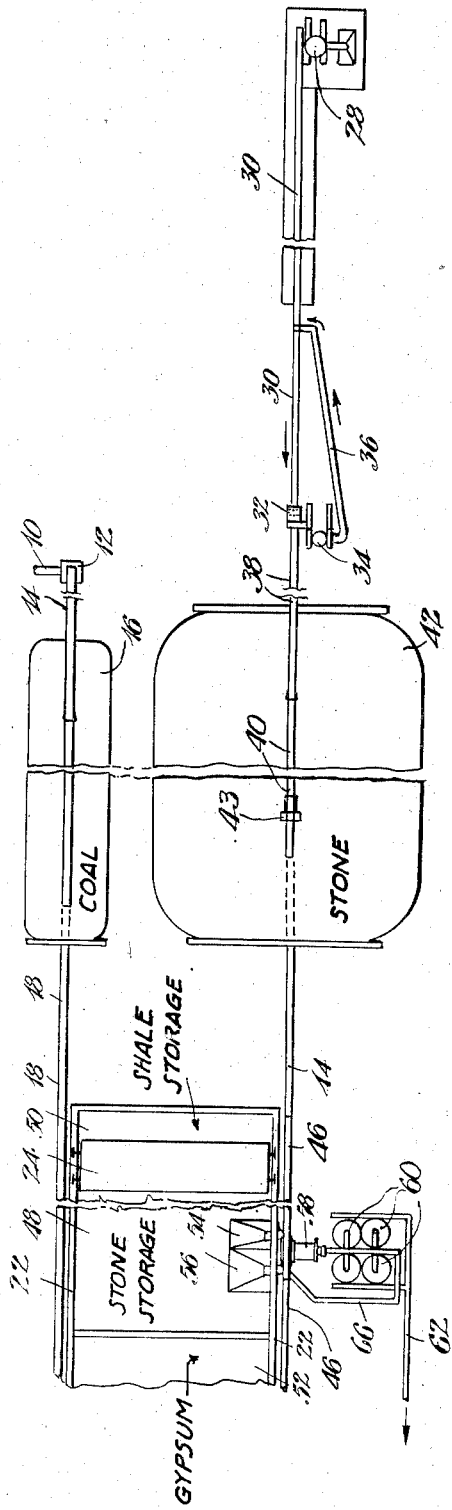

Aug. 7, 1951   J. E. KENNEDY   2,563,471
CEMENT PLANT AND METHOD OF OPERATION
Filed Feb. 16, 1946   2 Sheets-Sheet 1

INVENTOR
JOSEPH E. KENNEDY
BY
Pennie, Edmonds, Morton & Barrows
ATTORNEYS

Aug. 7, 1951  J. E. KENNEDY  2,563,471
CEMENT PLANT AND METHOD OF OPERATION
Filed Feb. 16, 1946                                    2 Sheets-Sheet 2
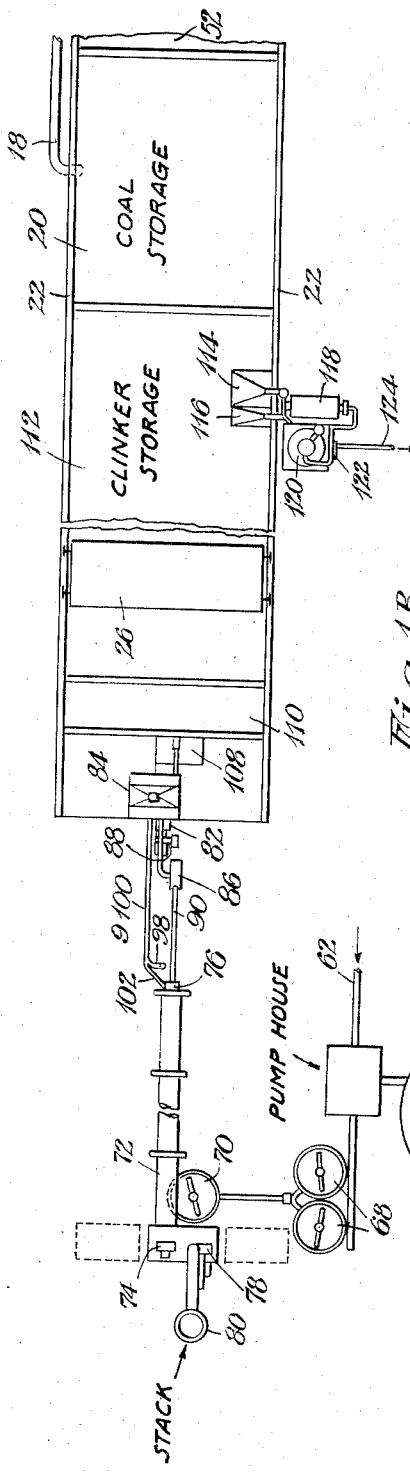
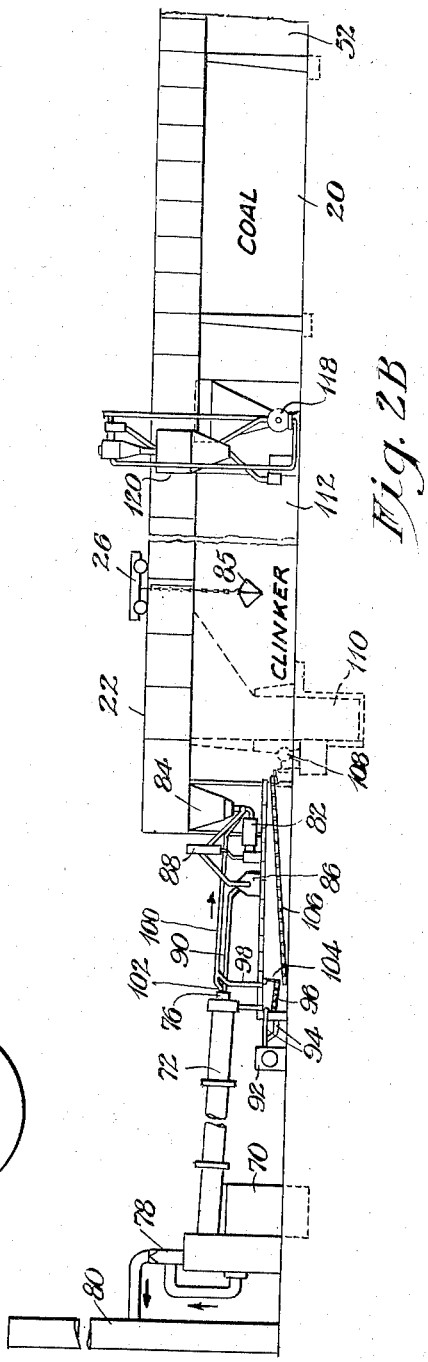
INVENTOR
JOSEPH E. KENNEDY
BY
Pennie, Edmonds, Morton & Barrows
ATTORNEYS Patented Aug. 7, 1951

2,563,471

UNITED STATES PATENT OFFICE 2,563,471

CEMENT PLANT AND METHOD OF OPERATION

Joseph Elliott Kennedy, New York, N. Y.

Application February 16, 1946, Serial No. 648,161

3 Claims. (Cl. 263—1)

My invention relates to improvements in cement plants and their method of operation, and more particularly to an improved plant or system, and to a process of producing cement in the improved plant.

One of the problems involved in the operation of cement plants of the present type is the maintenance of the equipment under the severe operating conditions in the presence of corrosive and erosive materials handled. Screw conveyors, for example, used for handling various materials in the plant, last a relatively short time and are often broken and out of order. Furthermore, critical parts of such conveyors must be replaced at frequent intervals because of the excessive wear. Elevators, such as bucket elevators are almost equally expensive and difficult to maintain. Furthermore, such large quantities of materials are handled in cement plants that the cost of equipment often prohibits the building of the plant, or at least increases the cost of production to such an extent that it may be impossible to operate in a competitive market.

According to the features of my invention, I have discovered that a cement plant can be built and operated successfully and at relatively low cost by entirely eliminating screw conveyors and mechanical elevators. The original cost and installation of such equipment is high because of the preciseness and accuracy with which the equipment must be made and installed. Furthermore, as stated above, the life of such equipment is relatively short. By making use of the features of my invention I am able to eliminate some of the most expensive items in the manufacture of cement.

According to my invention I provide a cement plant in which the raw materials are supplied to suitable storage areas by means of belt conveyors, and thereafter I handle substantially all materials by means of one or more overhead cranes which operate clam shells for picking up the material and for dumping it in the desired location. I have found that a crane can be utilized for supplying raw materials to the processing equipment and at the same time employed for removing the cooled clinker to the grinding equipment where the finished product is produced. In certain instances, a single crane, as for example, in a wet type process, is used for moving clinker in one direction and for taking coal to the pulverizer for the kiln while moving in the opposite direction.

The improved cement plant of my invention includes a storage for coal, a storage for raw materials, a storage for clinker, a kiln for receiving the mix to be calcined, and as an important feature, a special system for cooling the clinker from the kiln and at the same time preheating air used for firing the kiln, which is preferably fired with pulverized coal.

The improved plant of the present invention, as well as its mode of operation, includes other features which will be described in detail hereinafter in connection with the accompanying drawings forming a part of this application.

In the drawings, Figs. 1A and 1B are diagrammatic plan views which when placed end to end show the cement plant on a very small scale with portions broken away to simplify the showing.

Figure 2A:
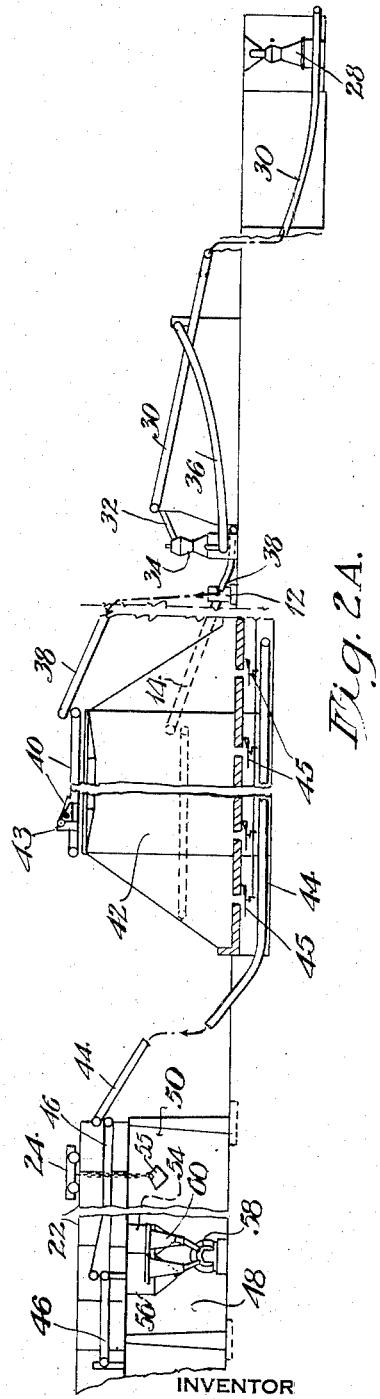

Figs. 2A and 2B are respectively elevational views which when placed end to end show the portions of the same plant shown in Figs. 1A and 1B, the equipment being shown diagrammatically on a very small scale.

Referring to Fig. 1A of the drawings, the coal to be used in the cement plant is delivered from a convenient source such as a railroad siding by a belt conveyor 10 to a crusher 12 from which it is delivered by a belt conveyor 14 to a ground storage 16 for crushed coal. Provision may be made for storing the coal up to fifteen feet deep so that a considerable quantity may be accumulated in this storage for use over a particular season or some particular time when it might be inconvenient to obtain coal deliveries. From the ground storage 16, the coal is delivered by a belt conveyor 18 to a storage bin 20, below a track-way 22, on which cranes 24 and 26 operate. The storage bin 20 as well as the track-way 22 preferably comprises a part of a suitably long and relatively large building for covered storage which is divided into storage bins in the manner described hereinafter.

The stone to be used in the manufacture of cement, according to the present invention, is delivered at the right of the plant and fed to a primary crusher, such as a gyratory crusher 28, by means of a steam shovel or other suitable or convenient means, the crusher being located below ground level, as indicated in Fig. 2A. The stone crushed by the crusher 28 is moved by means of an inclined belt conveyor 30 onto a vibrating screen 32. The material which fails to go through the screen, is passed into a secondary crusher 34 from which the crushed material is moved by means of a belt conveyor 36 back along the belt conveyor 30 and dumped thereon so that it is recycled to the vibrating screen 32. By this means a separate bin for the secondary crusher is eliminated, and means is provided for preventing anything which is not finer than one-half inch being sent to the bedding system or the ground storage.

All of the finished crushed stone delivered through the screen 32 passes through a chute onto upwardly-inclined belt conveyor 38 which delivers the crushed stone onto a distributing belt conveyor 40, over a ground storage or bedding storage 42. The conveyor 40 may include a traveling automatic reversible tripper 43 for distributing the product from any section of a quarry from one end of the bedding system to the other. When the separate products from all sections of a quarry are uniformly bedded in this way and all sections of the pile are drawn from and supplied to the process, a perfect mix is obtained for making a high-grade cement.

Beneath the bedding storage 42 is provided a reclaiming belt conveyor 44 which is preferably used in connection with disc feeders 45 of a well-known construction and distributed along the bedding system 42. These feeders 45, which receive stone through openings in the bedding floor, are driven at the same rate and all are arranged to feed the same quantity of stone onto the conveyor belt 44, thus giving an equalized cut or sample from all places in the quarry. The crushed stone on the belt 44 is carried up an incline and deposited onto a substantially horizontal belt conveyor 46 which carries the crushed stone to the stone storage bin 48 which is under the crane-way. The crane 24 may be used for distributing the crushed stone in the storage bin 48.

A shale storage bin 50 is provided at the right end of the building adjacent the stone storage 48. The shale for this storage may be brought into the plant through the crushers 28 and 34, delivered to a portion of the ground storage by the conveyor 40, and then delivered to the storage 50 from the conveyor 46. In a similar way gypsum for use in the plant and which is stored in a bin 52 between the stone storage bin 48 and the coal storage bin 20, is also brought in through the crushers 28 and 34 and dumped into the gypsum bin from the conveyor 46. A tripper of known construction, not shown, may be used for dumping the different products from the conveyor 46 into the respective bins. The foregoing procedure for handling the shale and gypsum for the plant eliminates a separate crushing plant for the shale and gypsum. It is an easy matter with the apparatus disclosed, to crush enough gypsum in a few hours in the crushers 28 and 34 to last for months. The same is true for the shale used in the cement process.

The cement manufacturing process of the present invention is illustrated as a wet process, and accordingly shale is delivered by a clam shell 55 of the crane 24 to a feed bin 54 while the clam shell also supplies stone to a feed bin 56. These materials, as shown in Figs. 1A and 2A, are fed at a regulated rate into a wet grinding tube mill 58 which delivers the ground product to four cone classifiers 60 for classifying the product. The overflow from the classifiers 60 with the finished material is delivered through a line 62 to a settling tank 64 of the thickener type (Fig. 1B). The oversized product from the cone classifiers 60 is returned to the mill 58 through a line 66, for regrinding. The slurry from the large tank 64 is pumped into slurry tanks 68 which deliver slurry to a tank 70 under the front end of a rotary kiln 72. The tank 70 under the kiln will be able to absorb some heat from the kiln so that the slurry will be partly preheated before it is pumped into the kiln. This step is accomplished by pumping the slurry by means of a pump, not shown, from the tank 70 to a slurry feeder 74, which is provided with an overflow, so that the excess slurry can be returned to the tank 70 when more is pumped than is required for giving the proper feed to the kiln 72.

The cement kiln 72 shown in Figs. 1B and 2B, is a relatively long rotary kiln which is fired by a burner 76 and which is provided with an exhauster 78 and a stack 80. The kiln 72 is shown as being fired with pulverized coal produced in a tube mill 82 to which coal is supplied from a hopper 84 which is kept filled with coal from the bin 20 by means of the overhead crane 26 and a clam shell 85. The tube mill is exhausted by means of a fan 86 which draws air and pulverized coal from the mill 82 up into a separator 88, from which the coarse coal particles are returned to the mill. The stream of pulverized coal and air from the exhauster fan 86 is delivered through a pipe 90 to the burner 76. The kiln can be fired with oil or gas if desired. Air is supplied to the tube mill 82 from a fan 92 (Fig. 2B) which delivers air under forced draft through lines 94 to points above and below a clinker cooler grate 96. The air forced into the clinker cooler by the fan 92 is heated by contact with the clinker on the grate 96 and delivered through a conduit 98 and a branch conduit 100 to the inlet of the tube mill 82. Secondary air for the burner 76 may be drawn from the conduit 98 through another branch line 102.

The extremely hot clinker reaching the end of the kiln 72, as shown in Fig. 2B, is delivered through a chute onto the cooling grate 96, which is preferably a vibrating grate adapted to advance the clinker down against a pivoted door 104. This door forms a closure for the space above the grate 96 to restrict the flow of air to the outlet duct 98. As the clinker accumulates against the swinging door 104, the bottom of the door swings to the right and permits the cooled clinker to fall onto an inclined conveyor 106 which delivers the cooled clinker to a crusher 108. The crusher 108 discharges into a pit 110 and the crushed clinker is picked up by the clam shell 85 of the overhead crane 26 and delivered to a clinker storage bin 112.

The clinker may be delivered as desired or convenient to a hopper 114 either directly from the pit 110 or from the bin 112, and gypsum is also supplied, by the overhead crane, to a hopper 116. These materials are fed by suitable proportional regulated feeders from the hoppers 114 and 116, to a large dry-grinding tube mill 118, in which the clinker and gypsum are ground together. From the tube mill the cement dust is passed to a cyclone separator 120 in an air stream induced by an exhauster 122 (Fig. 1B). The oversize material from the separator 120 is returned to the feed end of the mill 118, while the finished material will be conveyed by an automatic and continuously-operating air lift mechanism, not shown, through a line 124 to cement storage silos of the usual construction, not shown.

In some instances, it may be possible to carry out all of the handling operations along the crane-way 22 by the use of a single crane, such as the crane 24. However, two cranes are preferably employed, one of which may be utilized almost exclusively in the moving of coal from the bin 20 to the hopper 84 and the delivery of clinker from the pit 110 either to the clinker storage 112 or to the hopper 114. The delivery of gypsum to the hopper 116 may be rather infrequent, but the crane 26 will be able to cross the coal bin 20 and pick up the necessary gypsum from the bin 52 without inconvenience. The stone storage and shale storage in a plant of this type are relatively large, particularly the stone storage, so that the crane 24 may be pretty well occupied in supplying the shale and stone to the hoppers 54 and 56. If necessary, however, it will be apparent that the respective duties of the two cranes 24 and 26 may overlap to any desired or necessary extent. The use of overhead cranes avoids the use of screw conveyors and mechanical elevators and the problems, troubles and expense involved in their use.

The provision of an overlapping belt conveyor system and crane-way system in a straight-way arrangement of the equipment, together with the other arrangements shown in the drawings, provides a unique system for the handling of the materials in a cement plant in an economical manner. The straight line handle of the materials, together with the overlapping crane-way and belt conveyors eliminates considerable ground space for the plant as well as eliminating the use of separate crushers for handling gypsum and shale.

While the cement plant of the present invention, as well as its operation, has been described in connection with the use of shale, gypsum, and stone, the plant may be utilized in substantially the same manner if the materials processed are stone, gypsum and clay, although a wash mill may have to be provided for washing the clay before delivery to the wet grinding tube mill 58.

From the foregoing description, it will be understood that some changes might be made in the equipment used in the various steps without materially changing the general arrangement of the plant and its operation. Such changes are contemplated as coming within the scope of the appended claims.

What I claim as new is:

1. In a cement plant having means for handling raw materials and clinker without the use of screw conveyors or mechanical elevators, the improvement which comprises a plant layout including, in succession and in a substantially straight line, a raw materials crusher, a raw materials bedding storage means, a materials storage building long in the direction of the straight line layout and having storage bins arranged successively in the line of the layout, and a rotary kiln for producing cement clinker from the raw materials having charge and discharge ends, said kiln being arranged with its discharge end adjacent to the end of the storage building opposite the bedding storage, a belt conveyor extending from the raw materials crusher to and along the bedding storage means for conveying crushed raw materials thereonto, a belt conveyor system having portions extending respectively along the raw materials bedding storage means and along a plurality of the bins in the storage building, means for depositing raw material from the raw materials bedding storage means onto said portion of the belt conveyor system extending therealong, means for discharging raw materials from the portion of the belt conveyor system extending along the storage building into selected ones of said plurality of storage bins therein, a craneway extending the length of the storage building above the storage bins, a crane and clamshell operable along said craneway over the storage bins of the building for the transfer of materials stored therein, a raw materials grinding mill adjacent one side of the storage building, hoppers positioned for receiving raw materials handled by the crane and clamshell and for delivering raw materials to the raw materials grinding mill, means for conveying raw materials from the grinding mill to the charging end of the kiln, a cement clinker receiving pit in the end portion of the storage building adjacent to the discharge end of the kiln, means including a cement clinker cooler for transferring cement clinker from the discharge end of the kiln into the clinker pit in the storage building, and a cement clinker storage bin in the building adjacent to the clinker pit whereby cement clinker discharged into the pit may be readily transferred therefrom into the clinker storage bin by the crane and clamp-shell.

2. In a cement plant having means for handling raw materials and clinker without the use of screw conveyors or mechanical elevators, the improvement which comprises a plant layout including, in succession and in a substantially straight line, a raw materials crusher, a raw materials bedding storage means long in the direction of the straight line layout, a materials storage building long in the direction of the straight line layout and having storage bins arranged successively in the line of the layout, and a rotary kiln for producing cement clinker from the raw materials having charge and discharge ends, said kiln being arranged with its discharge end adjacent to the end of the storage building opposite the bedding storage, a belt conveyor extending from the raw materials crusher to and along the bedding storage means for conveying crushed raw materials thereonto over the length of the bedding storage, a belt conveyor system having portions extending respectively along the raw materials bedding storage means and along a plurality of the bins in the storage building, means at spaced points along the bedding storage for simultaneously feeding raw material from the raw materials bedding storage means onto said portion of the belt conveyor system extending therealong, means for discharging raw materials from the portion of the belt conveyor system extending along the storage building into selected ones of said plurality of storage bins therein, a craneway extending the length of the storage building above the storage bins, a crane and clamshell operable along said craneway over the storage bins of the building for the transfer of materials stored therein, a raw materials grinding mill adjacent one side of the storage building, hoppers positioned for receiving raw materials handled by the crane and clamshell and for delivering raw materials to the raw materials grinding mill, means for conveying raw materials from the grinding mill to the charging end of the kiln, a cement clinker receiving pit in the end portion of the storage building adjacent to the discharge end of the kiln, means including a cement clinker cooler for transferring cement clinker from the discharge end of the kiln into the clinker pit in the storage building, and a cement clinker storage bin in the building adjacent to the clinker pit whereby cement clinker discharged into the pit may be readily transferred therefrom into the clinker storage bin by the crane and clamshell.

3. In a cement plant having means for handling raw materials and clinker without the use of screw conveyors or mechanical elevators, the improvement which comprises a plant layout including, in succession and in a substantially straight line, a raw materials crusher, a raw materials bedding storage means, a materials storage building long in the direction of the straight line layout and having storage bins arranged successively in the line of the layout, and a rotary kiln for producing cement clinker from the raw materials having charge and discharge ends, said kiln being arranged with its discharge end adjacent to the end of the storage building opposite the bedding storage, a belt conveyor extending from the raw materials crusher to and along the bedding storage means for conveying crushed raw materials thereonto, a belt conveyor system having portions extending respectively along the raw materials bedding storage means and along a plurality of the bins in the storage building, means for depositing raw material from the raw materials bedding storage means onto said portion of the belt conveyor system extending therealong, means for discharging raw materials from the portion of the belt conveyor system extending along the storage building into selected ones of said plurality of storage bins therein, a craneway extending the length of the storage building above the storage bins, a crane and clamshell operable along said craneway over the storage bins of the building for the transfer of materials stored therein, a raw materials grinding mill adjacent one side of the storage building, hoppers positioned for receiving raw materials handled by the crane and clamshell and for delivering raw materials to the raw materials grinding mill, means for conveying raw materials from the grinding mill to the charging end of the kiln, a cement clinker receiving pit in the end portion of the storage building adjacent to the discharge end of the kiln, means including a cement clinker cooler for transferring cement clinker from the discharge end of the kiln into the clinker pit in the storage building, a cement clinker storage bin in the building adjacent to the clinker pit, a coal storage bin in the building adjacent to the clinker storage bin, and a coal hopper at the end portion of the storage building adjacent to the discharge end of the kiln for delivering coal for firing the kiln, said coal hopper being accessible to said crane and clamshell, whereby the crane and clamshell may deliver coal from the coal bin to the coal hopper when moving toward the kiln and transfer clinker from the clinker pit to the clinker storage bin when moving in the opposite direction.

JOSEPH ELLIOTT KENNEDY.

REFERENCES CITED

The following references are of record in the file of this patent:

UNITED STATES PATENTS

| Number | Name | Date |
| --- | --- | --- |
| Re. 15,505 | Hurt | Dec. 12, 1922 |
| 281,319 | Thomas | July 17, 1883 |
| 806,732 | Blaisdell | Dec. 5, 1905 |
| 841,677 | Edison | Jan. 22, 1907 |
| 1,561,213 | Buckbee | Nov. 10, 1925 |
| 1,596,956 | Weeks | Aug. 24, 1926 |
| 1,706,747 | Rigby | Mar. 26, 1929 |
| 2,052,329 | Wendeborn | Aug. 25, 1936 |
| 2,095,446 | Lee | Oct. 12, 1937 |
| 2,117,300 | Corser | May 17, 1938 |

OTHER REFERENCES

Pages 86, 89 of "The Rotary Kiln," published 1902 by A. M. S., Armstrong Harrison Building, Philadelphia.

Pages 25 to 28 of "The Chemistry of Cement and Concrete," by Lea and Desch.

Page 451 of Cement, Limes, and Plasters, by Eckel, 3rd edition.